United States Patent [19]

Ray

[11] Patent Number: 4,496,075
[45] Date of Patent: Jan. 29, 1985

[54] ROTARY METERING AND DISPENSING APPARATUS

[76] Inventor: Frank L. Ray, Rte. #2, Winfield, Kans. 67156

[21] Appl. No.: 431,347

[22] Filed: Sep. 30, 1982

Related U.S. Application Data

[63] Continuation-in-part of Ser. No. 178,135, Aug. 14, 1980, Pat. No. 4,444,130.

[51] Int. Cl.³ .............................................. G01F 11/14
[52] U.S. Cl. ................................... 221/235; 221/243; 221/266; 222/218; 222/350
[58] Field of Search .................... 111/77, 78; 221/233, 221/235, 243, 266; 222/350, 216, 217, 218, 225

[56]  References Cited

U.S. PATENT DOCUMENTS

| | | | |
|---|---|---|---|
| 451,761 | 5/1891 | Howland | 222/350 X |
| 607,502 | 7/1898 | Caldwell | 111/77 |
| 908,059 | 12/1908 | Allwardt | 221/266 X |
| 1,955,368 | 7/1932 | Hoberg et al. | 222/350 X |

FOREIGN PATENT DOCUMENTS 929603 6/1963 United Kingdom ................. 111/77

Primary Examiner—Joseph J. Rolla
Assistant Examiner—Lawrence J. Miller
Attorney, Agent, or Firm—Robert E. Breidenthal

[57]  ABSTRACT

A metering sleeve having radial openings in which radially extending plungers reciprocate to vary the effective volume of the openings, and a weight within the sleeve and connected to the plungers to reciprocate the latter in response to rotation of the sleeve. The plungers are loosely connected to the weight to lessen the tendency of the plungers to jam during rotation of the apparatus.

10 Claims, 7 Drawing Figures

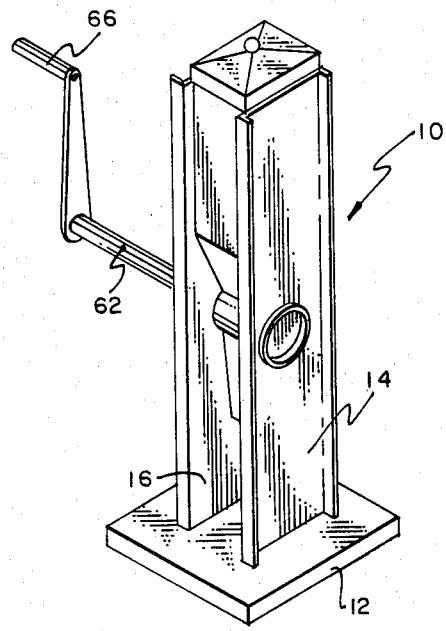
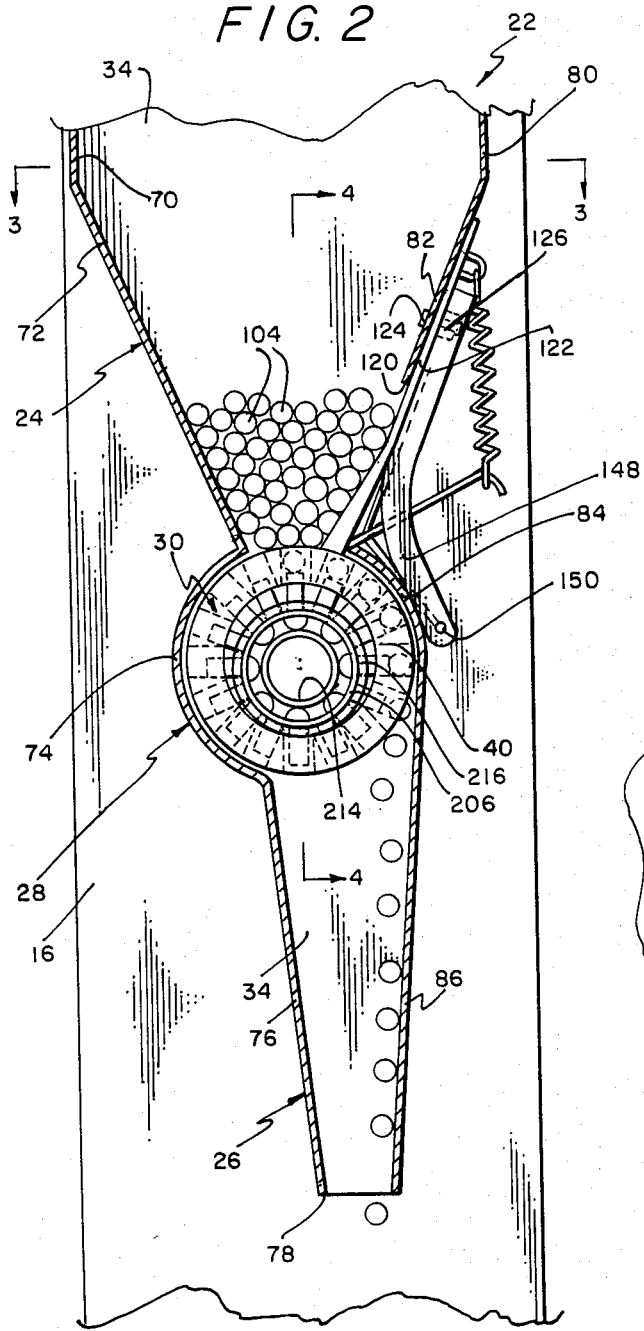
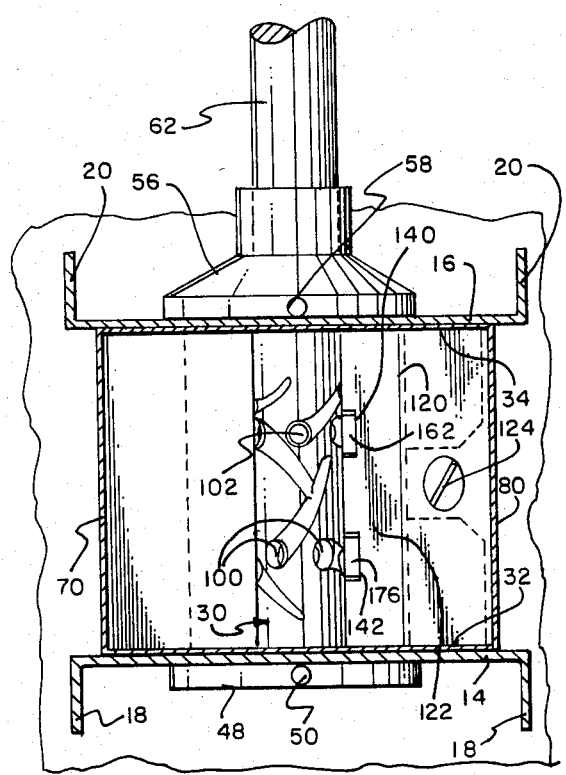

ROTARY METERING AND DISPENSING APPARATUS

This application is a continuation-in-part of U.S. Pat. No. 4,444,130, Apr. 24, 1984, with which it co-pended.

This invention relates to new and useful improvements in apparatus disclosed in my copending application (which issued as U.S. Pat. No. 4,444,130 on Apr. 24, 1984) for U.S. Letters Patent entitled Seed Planting Machine, that was filed Aug. 14, 1980, and bears application Ser. No. 178,135, and this application is a continuation-in-part application with respect to the same.

FIELD OF THE INVENTION

The present invention pertains to a rotary metering and dispensing device especially well suited for dispensing materials such as relatively uniformly sized and discrete solid objects, as for example, seeds, pellets or seeds, and capsulated materials, and the invention pertains more particularly to such devices that dispense a quantity of material that is essentially directed proportional to angular displacement of the rotary metering element, and wherein such element is of small radius.

The primary object of the invention is to provide a rotary metering and dispensing means that can be substituted for such means in apparatus like that disclosed in my aforementioned pending application for U.S. Letters Patent, namely, the rotary means at the bottom of the seed box and the knocker associated with such rotary means.

A broad aspect of the invention involves for use in metering and dispensing apparatus, a circular cylindrical sleeve having a central horizontal axis and being adapted for rotation about its axis, said sleeve having a plurality of circumferentially and equiangularly spaced radial openings therethrough, each of said openings being provided with a plunger that has limited radial movement therein between a radially extended position and a radially retracted position, with such plunger substantially obstructing the opening radially throughout its movement between said extended and retracted positions, and gravity actuated means connected to the plungers and disposed within the sleeve for rotation therewith that is operative in response to rotation of the sleeve to cyclically urge radial reciprocation of each of the plungers in such phased relation that the plungers associated with uppermost openings are radially retracted and those associated with lowermost openings are radially extended, whereby the radially outermost unobstructed volumes of the uppermost openings are maximized and those of the lowermost openings are minimized.

BRIEF DESCRIPTION OF THE DRAWINGS

The purpose, character and advantages of the invention will become quite manifest in the light of the following description of a preferred embodiment thereof, such description being given in the light of the accompanying drawings, wherein:

FIG. 1 is an isometric view of dispensing apparatus that incorporates the combined rotary metering element and ejector of the present invention;

FIG. 2 is an enlarged and fragmentary central vertical sectional view of the dispenser shown in FIG. 1, with hidden details being shown in dashed lines;

FIG. 3 is a fragmentary horizontal sectional view taken upon the plane of the section line 3—3 in FIG. 2, with hidden details being shown in dashed lines;

DETAILED DESCRIPTION OF THE INVENTION

Figure 4:
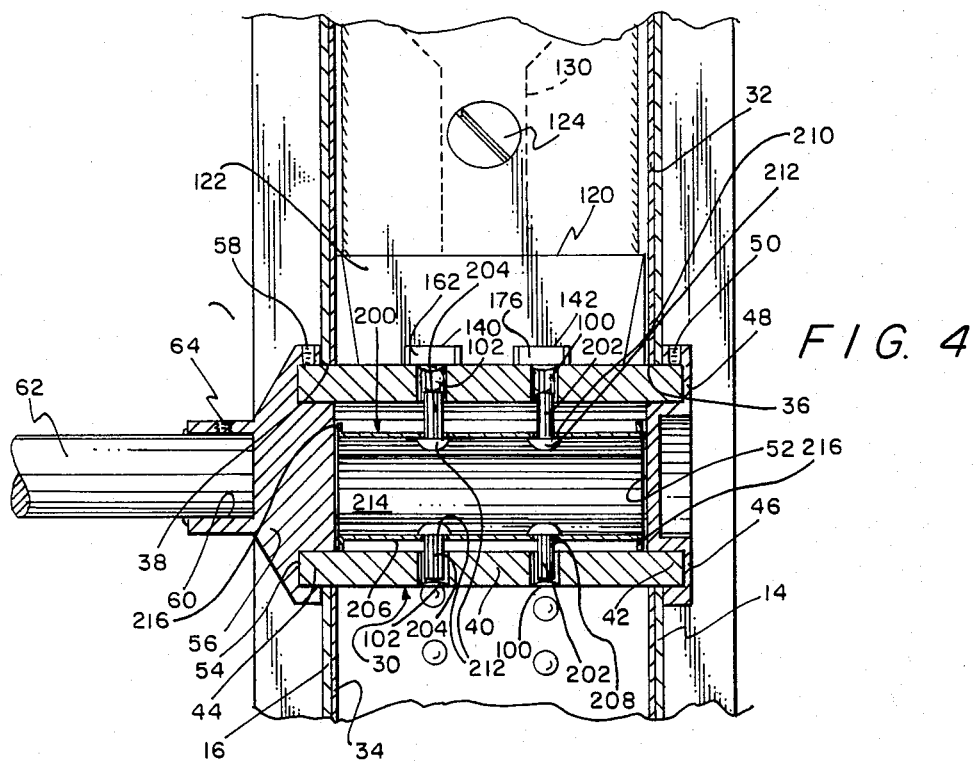
FIG. 4 is a fragmentary vertical sectional view taken upon the plane of the section line 4—4 in FIG. 2, with hidden details being shown in dashed lines.

Referring now to the drawings wherein like numerals refer to like parts throughout the various views, the reference numeral 10 designates a metering and dispensing unit or apparatus that incorporates the subject matter of the present invention.

The unit 10, preferably entirely of metal or steel construction, comprises a horizontal base 12 to which are suitably affixed or welded a pair of spaced, vertical and parallel side walls 14 and 16. The walls 14 and 16 can be provided with integral flanges such as those indicated at 18 and 20 for greater strength and better appearance. It is preferred that the base 12 be relatively massive for stability during use, though it can be mounted upon any supporting surface by any suitable conventional means not shown.

A combined hopper and delivery chute structure 22 is disposed between the side walls 14 and 16. The structure 22 includes a hopper designated generally at 24, a delivery chute designated generally at 26, with the hopper 24 and the chute 26 being integrally joined by a metering section designated generally at 28 that accommodates therein a rotary metering and ejector assembly that is designated generally at 30.

The combined hopper and chute structure 22, which is deemed to include the metering section 28, has side walls 32 and 34 that respectively seat against and which are fixedly secured in any suitable manner to the adjacent sides of the frame walls 14 and 16.

The walls 14 and 32, and the walls 16 and 34, are provided with aligned openings 36 and 38, which are circular, of the same size and have peripheries that are concentric about a horizontal axis.

The rotary metering and ejector assembly 30 includes a cylindrical sleeve 40 that is rotatably journaled through the openings 36 and 38 and projects short intervals outwardly from the remote sides of the walls 14 and 16 at 42 and 44, as best shown in FIG. 4.

The sleeve end portion 42 is received within an annular groove 46 of a closure member 48 that is releasably secured thereto by a set screw 50. For a reason to become apparent presently, the closure member 48 projects into the sleeve 40 to terminate at a plane surface 52. The other sleeve end portion 44 is received in an annular groove 54 in a crankshaft coupler 56 that is detachably secured thereto by a set screw 58.

The coupler 56 has a recess 60 therein that receives the end of a crankshaft 62 therein. The shaft 62 is retained in assembled relation by a set screw 64.

The crankshaft 62, which is aligned with the axis of the sleeve 40 is provided with a hand crank 66 at its free end by means of which the sleeve 40 can be rotated with free running clearance through the walls 14, 16, 32 and 34; it being understood the closure 48 and the coupler 56 have free running clearance as to the walls 14 and 16.

The front side of the combined hopper and chute 22 includes an integral front wall 70 that is downwardly and rearwardly inclined in the hopper portion 24 as at 72 to terminate at the top of the sleeve 40 forwardly of the axis of the latter, and thence arcs downwardly about the forward side of the sleeve 40 with free running clearance therebetween as at 74 in the metering section 28 and thence extends downwardly and from a position below the front half of the sleeve 40 as shown at 76 in the chute portion 26 to terminate at the discharge end of the chute indicated at 78. The discharge end 78 of the chute is spaced above the base 12.

It might be noted at this point that if deemed expedient or desirable, it should be evident that the chute portion 26 can be downwardly tapered laterally by simply having the lower portions of the walls 32 and 34 definitive of the chute portion 26 be formed or shaped to be downwardly convergent.

The combined hopper and chute 22 has an integral rear wall 80 that, like the front wall 70, joins the walls 32 and 34. The rear wall 80 includes a forwardly and downwardly inclined portion 82, a portion 84 that has free running clearance with the upper rear portion of the sleeve 40 that merges with a fowardly and downwardly inclined portion 86 that extends to the discharge end of the chute 78 to afford in conjunction with the front wall portion 76 a fore and aft downward taper to the chute portion 26 as shown in FIG. 2.

The sleeve 40 is provided with two axially spaced rows of circumferentially spaced circular openings 100 and 102. The openings 100 and 102 are of a diameter greater than the maximum diameter of the objects to be metered and are also of a diameter less than one and one-half times the average diameter of of the objects 104 to be dispensed from the hopper 24 to which an upper portion of the sleeve 40 and its openings 100 and 102 are exposed. The size of the openings 100 and 102 are such that an individual object can be readily received therein but so that little if any part of a second object can be received therein. A similar consideration also applies to the wall thickness of the sleeve 40 as will become evident.

While the wall portion 82 can be extended to the surface of the sleeve 40, such could possibly result in damage to objects 104 disposed in openings 100 and 102 as such objects encounter the wall 82 if so extended. To avoid such damage a wiper assembly designated generally at 110 (see FIGS. 5 and 6) is provided having two wiper units 112 and 114. The number of units (2) corresponds to the number of rows (2) of the openings 100 and 102. It will become manifest that only one row of openings or more than two rows of openings can be provided. Indeed, it should be manifest that a row of openings can include any desired number of openings and may be comprised of a single opening if deemed desirable or expedient.

With the optional provision of the wiper 110, the wall 82 is cut away at 120 as shown clearly in FIG. 2 to leave an opening therebelow to the upper end of the wall portion 84, and such opening is closed by the closure wall 122 of the wiper 110. The closure wall 122 is seated against the rear face of the wall 82 and secured thereto by a headed bolt 124 that extends through the wall 82 and a nut 126 threaded thereon. The attachment of the wiper 110 is adjustable in that the bolt 124 extends through a slot 130 in the upper extent of the closure wall 122 to afford a degree of vertical adjustment when the clamping nut 126 is loosened.

The wall 122 has its lower edge positioned in close proximity to the sleeve as plainly shown in FIGS. 2, 3, and 4.

The closure wall 122 is provided with a pair of openings 140 and 142 at its lower edge that are of generally rectangular configuration, of short vertical height and which open through the lower edge of the wall 122 at positions in registry with the openings 100 and 102 in the sleeve 40. It will be observed that the number of openings 140 and 142 like the number of wiper units 112 and 114 correspond in number to the number of rows of openings 100 and 102.

Figure 5:
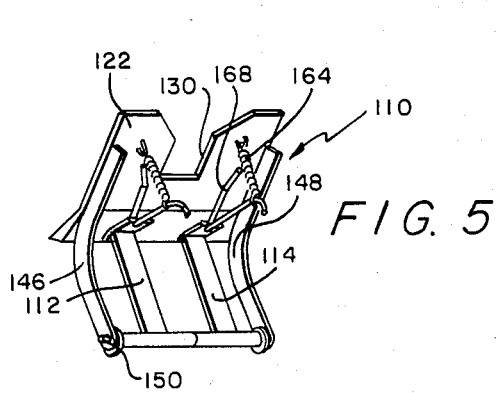
FIG. 5 is an isometric view of the wiper unit apart from the remainder of the apparatus.
Figure 6:
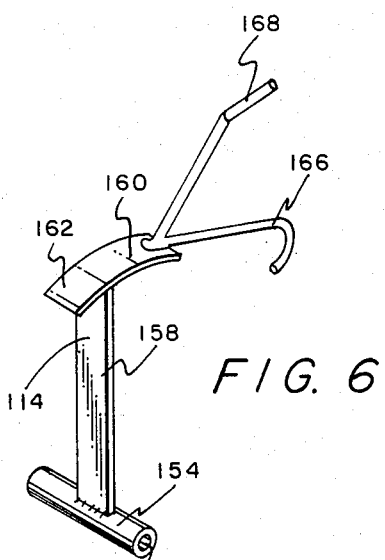
FIG. 6 is an enlarged isometric view of one of the wiper elements of the wiper unit shown in FIG. 5; and, FIG. 7 is an isometric view of the rotary element with the ejector removed therefrom.

The wiper 110 has attached thereto a pair of spaced downwardly and rearwardly extending arms 146 and 148 with a pivot pin 150 being fixed to extend between their free ends. The wiper units 112 and 114 are pivotally mounted upon the pin 150 in side-by-side relationship as shown in FIG. 5. As such wiper units 112 and 114 are identical, a detailed description of the unit 114 will suffice for both. The unit 114 comprises a sleeve 154 having an opening 156 therethrough that receives the pin 150. An arm 158 is centrally fixed to the sleeve 154 to extend radially therefrom, and a somewhat arcuate plate 160 is secured to the free end of the arm 158 at approximately right angles thereto. One end of the plate 160 constitutes a gate 162 that is normally received within or closes the closure plate opening 140. The wiper unit 114 is yieldingly biased about its pivot 150 so as to urge the gate 162 toward the sleeve 40, and this is accomplished by a coiled tension spring 164 having one end fixed to the plate or closure wall 122 and its other end connected to an arm 166 carried by the plate 160. Another arm 168 is also secured to the plate 160 and is disposed to engage the wall 122 to act as a stop and limit the pivotal motion urged by the spring 164 so that at least free running clearance between the gate 162 and the sleeve 40 is maintained. It will be noted in FIG. 4 that the axial extent of the gate 162 is somewhat less than that of the closure wall opening 142.

The gate of the wiper unit 114 is indicated at 176 and the same is disposed as shown in FIG. 4 to effectively close the opening 142. Proper axial registry of the gates 162 and 176 with the openings 140 and 142 is assured by the lengths of the pivot sleeves 154 being such as to prevent axial movement of the wiper units 112 and 114 relative to the arms 146 and 148 and hence also with respect to the closure wall 122.

Disregarding for the moment any possibility of objects 104 passing through the openings 100 and 102 to the interior of the sleeve 40, the operation of the invention as thus far described will be readily understood. On turning the crank so as to effect clockwise rotation of the sleeve 40 as viewed in FIG. 2, objects 104 are received in the openings 100 and 102 and are carried to the location of the gates 162 and 176 by an opening 102 and then by an opening 100 and so on in alternate order for the reason that openings 100 and 102 are angularly interposed or interdigitated with respect to each other. The arrangement is such that a predetermined angular rotation occurs between each arrival of an opening at one of the gates, and the arrival of the next opening at the other gate.

In the event that none of the objects 104 project excessively from the sleeve 40 the objects pass under the closure wall 122 and thence the wall portion to descend in the chute 26. In the event that any object 104 projects excessively above the sleeve 40 by reason of its size or for any other reason such as a second object or fragment thereof being in the opening, the protruding portion of the object 104 encounters the associated gate and exerts sufficient force thereon to urge movement of the wiper gate from the sleeve 40. Such force is sought to be less than that which will damage the object 104, and for this purpose the association of the gate to the sleeve is such that its radial outward movement is accompanied by a movement component in the direction of rotation of the sleeve 40.

It will be noted that the wall portion 84 has more than free running radial clearance with the sleeve 40 and is such that sufficient clearance is afforded any object whose passage is allowed by the gates 162 and 176.

It will be noted that the wall portion 74 can also be afforded more than just free running clearance with the sleeve 40, it only being necessary that objects 104 cannot pass between the wall portion 74 and the sleeve 40.

Figure 7:
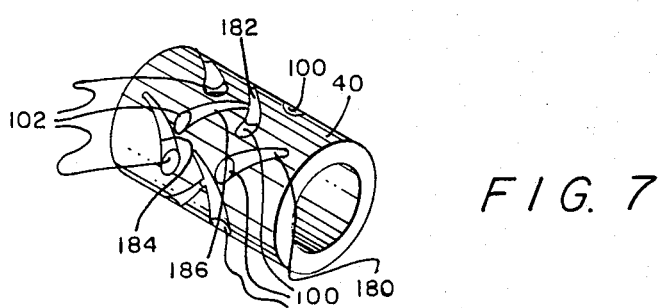

In order to facilitate the entry of objects 104 into the openings 100 and 102, the surface of the sleeve 40 is provided with shallow guide channels that extend obliquely from the openings 100 and 102 in the direction that the sleeve rotates, such channels or guide grooves being of their greatest widths and depths at the openings 100 and 102 and tapering in width and depth to their extremities. Preferably the channels associated with successive openings are directed obliquely in opposite direction as apparent on viewing the channels 180 and 182 associated with successive openings 100 as shown in FIG. 7. Similarly, the channels 184 and 186 show such relationship in relation to successive holes or openings 102 as shown in FIG. 7. The arrangement is such, as will be evident, that the channels tend to move objects 104 axially of the sleeve 40 into registry with the openings 100 and 102.

The ejector aspect of the combined metering and ejection assembly 30 also serves the important functions of preventing the passage of objects through the openings 100 and 102 into the interior of the sleeve 40 and limiting the radial extent of the openings 100 and 102 available to accept or receive objects 104 when such openings 100 and 102 communicate with the interior of the hopper 24. Such structure of the invention has an overall appearance somewhat like that of a sheepfoot packer commonly employed for compacting earth as road or dam building sites, namely, that of a generally cylindrical body having a plurality of radially extending projections or feet.

The structure referred to above is designated generally at 200 and comprises a plurality of radially extending plungers 202 that extend from within the sleeve 40 into the openings 100 wherein they make a loose fit and are radially movable between radially extended positions and radially retracted positions. The plungers 202 disposed in openings 100 at the bottom of the sleeve are in extended position, and those in the uppermost openings 100 are in retracted position as clearly shown in FIG. 4; such being for a reason to be presently explained.

Another set of radially extending plungers 204 are similarly associated with the openings 102.

Gravitationally actuated means are provided that are responsive to rotation of the sleeve 40 for effecting the aforementioned limited reciprocation of the plungers 202 and 204 in the openings 100 and 102. Such gravitationally actuated means are generally cylindrical in shape and are connected to the plungers 202 and 204 in such a manner that the latter extend perpendicularly therefrom and preferably with a limited degree of freedom about such orientation.

The gravitationally actuated means comprises a sleeve 206 having openings 208 and 210 that loosely receive the plungers 202 and 204 so that the latter extend perpendicularly from the sleeve with a limited degree of freedom about such orientation normal to the sleeve 206.

The radially innermost ends of the plungers 202 and 204 have enlarged heads 212 and are retained in position by an inner sleeve 214 disposed radially inwardly of and bearing against the heads 212. The fit of the sleeve 214 within the heads 212 is preferably sufficiently snug that the same is denied axial movement though such is not essential as the closure and the coupler at the opposite ends of the sleeve 40 prevent excessive axial displacement.

The diameter of the sleeve 206 is substantially less than that of the inside of the sleeve 40 so that the sleeve 206 is allowed lateral displacement sufficient to allow the desired degree of reciprocating movement of the plunger 202 and 204. The lateral displacement is also permitted by reason of the looseness of fit of the plungers 202 and 204 in the openings 102 and 104, and also by reason of the limited freedom allowed as to the orientation of the plungers mentioned previously.

In order to limit the displacement of the sleeve 206 as parts wear and as the plungers become somewhat looser as it is thought they might become after long use and wear, the end extremities of the sleeve 206 are provided with flanges 216 that will contact the inner surface of the sleeve 40.

The movement of the plungers 202 and 204 are such that in their retracted position at the top of the sleeve the depth of the associated opening available for acceptance of an object is approximately the diameter of the opening as clearly shown in the drawings. At the same time the retracted plunger nonetheless obstructs or effectively closes the opening.

It will be understood that the weight of the plungers and the sleeves 206 and 214 are such as to gravitationally effect the described plunger reciprocation on rotation of the sleeve 40. If desired, the weight can be increased by using a solid bar or rod in lieu of the sleeve 214.

It will be appreciated that the overall radial dimensions of the rotary component of the metering device defined by the diameter of the sleeve 40 is considerably less than can be otherwise achieved when components in addition to a knocker must be provided to prevent objects entering the interior of the sleeve. Such radial minimization affords all the benefits ordinarily associated with compactness by enabling dispensing of objects near an axis of rotation which is highly desirable in seed planting wheels and in metering apparatus as herein disclosed.

Attention is now directed to the appended claims to ascertain the actual scope of the invention.

I claim:

1. For use in metering and dispensing apparatus, a circular cylindrical sleeve having a central horizontal axis and being adapted for rotation about its axis, said sleeve having a substantial wall thickness and being provided with a plurality of circumferentially and equiangularly spaced radial openings therethrough that lie in a common plane perpendicular to the axis of the sleeve, each of said openings being provided with a plunger that extends thereinto from within the sleeve with a free radial movement therein that is limited in extent to an amount less than the wall thickness of the sleeve between a radially extended position and a radially retracted position, with such plunger substantially obstructing the opening radially throughout its movement between said extended and retracted positions, and a common gravity actuated means disposed within the sleeve for rotation therewith that is operatively connected to all the plungers for operation in response to rotation of the sleeve to cyclically urge radial reciprocation of each of the plungers in such phased relation that the plungers associated with uppermost openings in the sleeve are radially retracted and those associated with lowermost openings in the sleeve are radially extended, whereby the radially outermost unobstructed volumes of the uppermost openings are maximized and those of the lowermost openings are minimized, said gravity actuated means having a generally cylindrical overall configuration and having a central axis with said plungers extending radially outward therefrom, and means loosely connecting each of the plungers to the gravity actuated means that enables each plunger a limited degree of angular freedom about a direction that is normal to the axis of said gravity actuated means.

2. The combination of claim 1, together with said gravity actuated means being provided with axially spaced radially extending flanges for limiting the lateral displacement of the axis of the gravity actuated means and the sleeve.

3. The combination of claim 1 together with a hopper disposed above the sleeve for feeding the uppermost openings of the sleeve, and dispensing chute means below the sleeve for receiving any objects ejected from the lowermost openings of the sleeve, and means for enabling rotation of the sleeve.

4. The combination of claim 1 together with a hopper disposed above the sleeve for feeding the openings at the top of the sleeve, said hopper having a wall with a lower edge terminating in spaced proximity to the sleeve, and said sleeve being provided with obliquely extending channels in its outer surface extending from the openings in the sleeve for axially urging movement of objects in the hopper toward said openings in the sleeve while concurrently allowing radially inward movement of such objects relative to the sleeve.

5. The combination of claim 4, wherein said wall has an opening at its lower edge in axial registry with the openings in the sleeve, and a movable gate biased to normally close the last mentioned opening.

6. The combination of claim 1, wherein said gravity actuated means comprises a second cylindrical sleeve disposed within the first mentioned sleeve and having openings therein which receive the plungers radially therethrough, and means within the second sleeve for limiting radial inward movement of the plungers relative to the second sleeve, with said second sleeve having an external radius less than the internal radius of the first mentioned sleeve, whereby the axis of the second sleeve can be laterally displaced from the axis of the first mentioned sleeve.

7. The combination of claim 6 together with axially spaced, radially extending flanges on the second sleeve for limiting lateral displacement of the axes of the sleeves.

8. The combination of claim 1, wherein said gravity actuated means comprises a second generally cylindrical sleeve having an outer diameter less than the internal diameter of the first mentioned sleeve, said second sleeve having a plurality of openings corresponding in number and relative location to the openings in the first mentioned sleeve, said plungers loosely extending through the openings in the second sleeve and means for limiting radial movement of the plungers relative to the second sleeve.

9. The combination of claim 8, wherein said last recited means comprises said plungers having radially innermost ends disposed within the second sleeve that are larger than the openings in the second sleeve through which they extend, and a cylindrical body extending axially through the second sleeve and engageable with the radially innermost extremities of the plungers to limit radially inward movement of the plungers in the second sleeve.

10. The combination of claim 9, together with means for limiting axial movements of the second sleeve and the cylindrical body relative to the first mentioned sleeve.

* * * * *